(12) United States Patent
Liu et al.

(10) Patent No.: US 11,162,583 B2
(45) Date of Patent: Nov. 2, 2021

(54) GEAR SHIFT LINKAGE MECHANISM AND GEAR SHIFT APPARATUS

(71) Applicant: GUANGZHOU AUTOMOBILE GROUP CO., LTD., Guangdong (CN)

(72) Inventors: Zhigang Liu, Guangdong (CN); Zhenwen Chen, Guangdong (CN); Yushan Zhu, Guangdong (CN); Zhaochen Dong, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 373 days.

(21) Appl. No.: 16/340,686

(22) PCT Filed: Oct. 22, 2018

(86) PCT No.: PCT/CN2018/111295
§ 371 (c)(1),
(2) Date: Apr. 9, 2019

(87) PCT Pub. No.: WO2019/184314
PCT Pub. Date: Oct. 3, 2019

(65) Prior Publication Data
US 2021/0246981 A1 Aug. 12, 2021

(30) Foreign Application Priority Data
Mar. 29, 2018 (CN) .......................... 201810276155.6

(51) Int. Cl.
*F16H 63/34* (2006.01)
*F16H 61/22* (2006.01)
(Continued)

(52) U.S. Cl.
CPC ............. *F16H 63/34* (2013.01); *F16H 61/22* (2013.01); *F16H 59/10* (2013.01); *F16H 2061/223* (2013.01); *F16H 2063/3079* (2013.01)

(58) Field of Classification Search
CPC .......... F16H 63/34; F16H 61/22; F16H 59/10; F16H 2061/223; F16H 2063/3079
See application file for complete search history.

(56) References Cited

U.S. PATENT DOCUMENTS 5,549,020 A * 8/1996 Gundrum ................ F16H 63/30
403/343
6,308,813 B1 * 10/2001 Carlson ................... F16H 61/22
188/267.1

(Continued)

*Primary Examiner* — Zakaria Elahmadi

(57) ABSTRACT

A gear shift linkage mechanism includes a gear shift linkage assembly and a spherical bowl for connecting to a gear shift rocker arm. The gear shift linkage assembly includes a connecting member, a gear shift linkage, a first elastic element, and a second elastic element. One end of the connecting member is connected with the spherical bowl, one end of the gear shift linkage is movably configured in the cavity. One end of the first elastic element presses against the limiting portion, and another end of the first elastic element is supported on the cavity. One end of the second elastic element presses against the limiting portion, and another end of the second elastic element is supported on the first through hole. The gear shift linkage mechanism efficiently improves the buffering and damping effect of the gear shift linkage assembly, and thus prevents damage of the transmission.

9 Claims, 6 Drawing Sheets

(51) Int. Cl.
  *F16H 59/10* (2006.01)
  *F16H 63/30* (2006.01)

(56) References Cited

U.S. PATENT DOCUMENTS

| | | | |
|---|---|---|---|
| 9,556,958 B2* | 1/2017 | Tsukamoto | F16H 61/26 |
| 9,784,303 B2* | 10/2017 | Jang | F16C 1/101 |
| 2014/0090499 A1* | 4/2014 | Fernandez | F16H 59/0208 74/335 |
| 2015/0007683 A1* | 1/2015 | Aoki | F16C 1/145 74/502.4 |
| 2015/0008092 A1* | 1/2015 | Mang | F16H 63/3416 192/219.4 |
| 2017/0276237 A1* | 9/2017 | Luvison | G05G 1/06 |
| 2018/0009507 A1* | 1/2018 | Roehrig | F16H 63/502 |
| 2019/0113134 A1* | 4/2019 | Ford | F16L 19/061 |
| 2019/0136972 A1* | 5/2019 | Sinka | F16H 61/24 |

* cited by examiner

GEAR SHIFT LINKAGE MECHANISM AND GEAR SHIFT APPARATUS

FIELD OF THE INVENTION

The present disclosure relates to automobile shifting mechanism and, more particularly to a gear shift linkage mechanism and a gear shift apparatus with the same.

BACKGROUND OF THE INVENTION

At present, in the shifting operation of the automobile shifting mechanism is as follows: the gear shift linkage mechanism is driven by the actuator, and the gear shift rocker arm on the transmission is manipulated for gear shifting. Factors such as the damping performance of the gear shift linkage and the damping stroke will affect the performance of the gear shift rocker arm, which will eventually affect the gear shifting effect of the whole vehicle. Therefore, the gear shift linkage mechanism is critical to the shifting reliability and the HVH performance.

FIG. 1 is a gear shift linkage mechanism used in a vehicle of the prior art, the gear shift linkage mechanism includes a linkage assembly 1', a damping rubber 2', and a spherical bowl 3' connected to the gear shift rocker arm. Specifically, the linkage assembly 1' is rigidly connected to the spherical bowl 3', and the damping rubber 2' is disposed between the linkage assembly 1' and the spherical bowl 3' to buffer the gear shift rocker through the damping rubber 2'.

However, in the process of implementing the present disclosure, the inventors have found that at least the following problems exist in the prior art: due to the hardness and durability requirements of the damping rubber, the deformable displacement and the bearing force are limited, and the vibration transmission attenuation is small, thus the shifting rocker arm could not act sufficient cushioning and damping effect, resulting in poor damping effect of the gear shift linkage mechanism and easy damage to the transmission.

SUMMARY OF THE INVENTION

An aspect of the present disclosure is to provide a gear shift linkage mechanism and a gear shift apparatus, so as to solve the technical problem of poor damping effect of the conventional gear shift linkage mechanism, thereby efficiently improving the buffering and damping effect of the gear shift linkage assembly, and finally preventing the transmission from being damaged.

To achieve the above objective, the present disclosure provides a gear shift linkage mechanism comprising a gear shift linkage assembly and a spherical bowl for connecting to a gear shift rocker arm. Specifically, the gear shift linkage assembly includes a connecting member with a cavity defined therein, one end of the connecting member being connected with the bowl, and another end of the connecting member being provided with a first through hole; a gear shift linkage provided with a limiting portion, one end of the gear shift linkage being movably engaged in the cavity, and another end of the gear shift linkage passing through the first through hole; a first elastic element formed on one end of the gear shift linkage, one end of the first elastic element abutting against one end of the limiting portion, and another end of the first elastic element being supported on one end, which is distal from the first through hole, of the cavity; and a second elastic element sleeved on another end of the gear shift linkage, one end of the second elastic element abutting against another end of the limiting portion, and another end of the second elastic element being supported on the first through hole.

As a preferred embodiment, the connecting member comprises an inner locking sleeve, an outer locking sleeve sleeved on the inner locking sleeve, and the cavity defined between an inner chamber of the inner locking sleeve and an inner chamber of the outer locking sleeve; the first through hole is formed on one end of the outer locking sleeve, and an end, which is distal from the first through hole, of the inner locking sleeve is connected with the spherical bowl; the end of the gear shift linkage is movably configured in an inner chamber of the inner locking sleeve, and another end of first elastic element is supported on an inner wall of the inner locking sleeve.

As a preferred embodiment, an elastic lock is provided on the outer locking sleeve and extended along a circumferential direction of the outer locking sleeve, a first limiting groove and a second limiting groove are provided on an outer wall of the inner locking sleeve and extended along an axial direction of the inner locking sleeve, and the first limiting groove and the second limiting groove are spaced apart along a circumferential direction of the inner locking sleeve; the elastic lock is engaged in the first limiting groove when the inner locking sleeve is inserted into the outer locking sleeve; and the elastic lock is disengaged from the first limiting groove and finally engaged in the second limiting groove, when the outer locking sleeve is rotated relative to the inner locking sleeve into the locking position.

As a preferred embodiment, one end, which is distal from the spherical bowl, of the first limiting groove is provided with an axial limiting portion.

As a preferred embodiment, a third through hole is provided on the outer locking sleeve and extended along the circumferential direction of the outer locking sleeve, one end of the elastic lock is connected to a wall of the third through hole, and another end of the elastic lock is provided with a bulge portion which is configured towards the inner chamber of the inner locking sleeve; the bulge portion is engaged in the first limiting groove when the inner locking sleeve is inserted into the outer locking sleeve; and the bulge portion is disengaged from the first limiting groove and finally engaged in the second limiting groove, when the outer locking sleeve is rotated relative to the inner locking sleeve into the locking position.

As a preferred embodiment, internal threads are provided on an outer wall of the outer locking sleeve and extended along the axial direction of the outer locking sleeve, external threads that match with the internal threads are provided on an outer wall of the inner locking sleeve, and the external threads are engaged with the internal threads once the outer locking sleeve is rotated relative to the inner locking sleeve into the locking position.

As a preferred embodiment, the gear shift linkage assembly further comprises a locking pin having a locking pin body connected to the limiting portion and a locking portion connected to the locking pin body; the inner locking sleeve is provided with a first adjusting slot running through the inner and outer walls of the inner locking sleeve, the outer locking sleeve is provided with a second adjusting slot running through the inner and outer walls of the outer locking sleeve, and a free end of the locking pin passes through the first adjusting slot and the second adjusting slot.

As a preferred embodiment, a first mounting hole is provided on the limiting portion, and the locking pin body is engaged with the first mounting hole by interference fit.

As a preferred embodiment, the first adjusting slot is configured along an axial direction of the inner locking sleeve, the second adjusting slot comprises a first slot section and a second slot section communicating with one another, the first slot section is configured along an axial direction of the outer locking sleeve, the second slot section is configured along a circumferential direction of the outer locking sleeve, and the free end of the locking pin moves from the second slot section to the first slot section when the outer locking sleeve is rotated relative to the inner locking sleeve into the locking position.

Accordingly, the present disclosure further provides a gear shift apparatus comprising an actuator, a gear shift rocker arm and the gear shift linkage assembly mentioned above, and the actuator has a driving end connected to an end of the gear shift linkage that passes through the first through hole, and the gear shift rocker arm is rotatably connected to the spherical bowl.

In comparison with the prior art, the present disclosure has the following beneficial effects. First, because the first elastic element and the second elastic element are sleeved on the gear shift linkage, thus when the shock load generated during the gear shifting is transmitted to the gear shift linkage, the vibration of the gear shift linkage can be reduced and damped due to the elastic action and the balance of the first and the second elastic elements located at two ends of the limiting portion, therefore vibration reduction and damping effect of the gear shift linkage in the connecting member can be achieved without using a damping rubber.

Meanwhile, since the first elastic element and the second elastic element are located at the two ends of the limiting portion, thus the gear shift linkage can be balanced and do to-and-fro movement in the cavity. By comparison with the damping rubber, the buffer stoke of the first and the second elements is larger, thereby sufficient buffering and damping function is acted to the gear shift rocker arm, and improving buffering and damping efficiency of the gear shift linkage mechanism.

Additionally, both the first elastic element and the second element have spring characteristics and locate at two end of the limiting portion, so as to balance the gear shift linkage. By comparison with the condition that the gear shift linkage is fixedly connected in the connecting member in the prior art, the present disclosure can release axial freedom of the gear shift linkage in the connecting member, thereby achieving the movement of the gear shift linkage in the cavity, eliminating internal stress and achieving buffering and damping efficiency during the gear shifting operation.

Finally, since the gear shift linkage can move in the cavity, thus the length of the gear shift linkage is adjustable, which is beneficial to easily install the gear shift linkage between different transmissions and the actuator. Further, during the gear shifting operation, the gear shift linkage mechanism can reduce the vibration, coming from the actuator, of the transmission to the minimum, and obtain the maximum vibration transfer pad value, thereby efficiently improving the buffering and damping efficiency of the gear shift linkage mechanism, so as to protect the transmission.

REFERENCE NUMERALS

Figure 1:
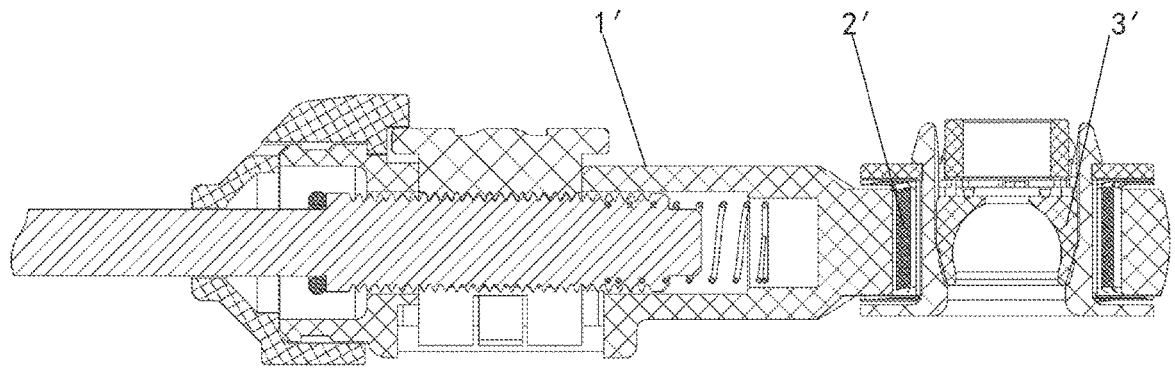
FIG. 1 is a schematic diagram of a conventional gear shift linkage mechanism.
Figure 2:
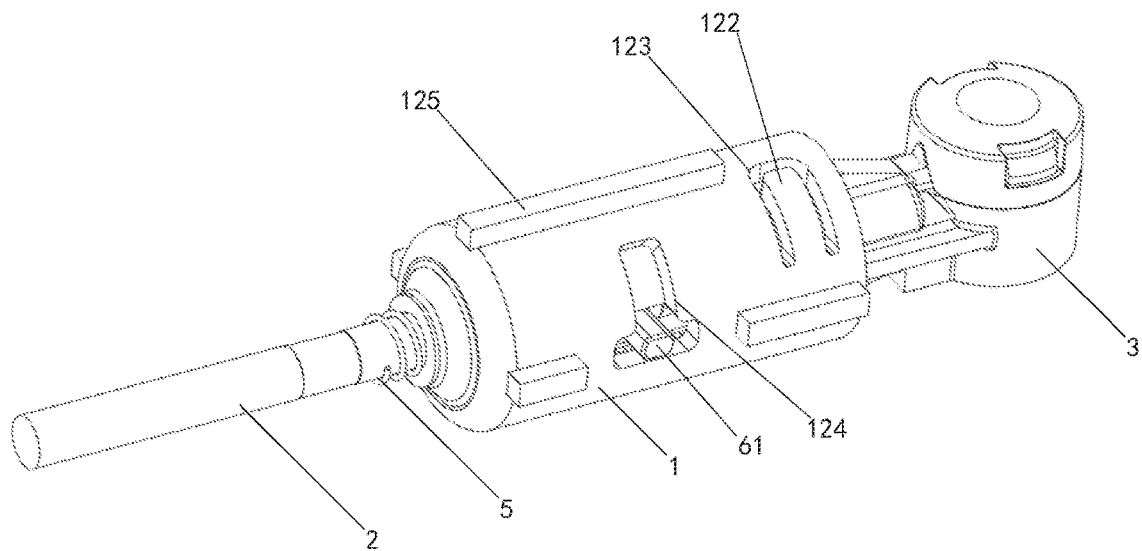
FIG. 2 is a structural diagram of a gear shift linkage mechanism according to an embodiment of the present disclosure.

1' connecting member; 11 inner locking sleeve; 111 first limiting groove; 112 second limiting groove; 113 axial limiting portion; 114 first adjusting slot; 115 external threads; 116 stepped bore, 12 outer locking sleeve; 121 first through hole; 122 elastic lock; 1221 bulge portion; 123 third through hole; 124 second adjusting slot; 1241 first adjusting slot section; 1242 second slot section; 125 antiskid reinforcement; 126 internal thread; 2 gear shift linkage; 21 limiting portion; 211 first mounting hole; 3 spherical bowl; 31 spherical bowl recess; 32 rocker arm spherical bowl; 33 cushion pad; 34 spherical bowl cover; 4 first elastic element; 5 second elastic element; 6 locking pin; 61 locking portion; 7 actuator; 71 dust cover; 8 transmission; 81 gear shift rocker arm.

DETAILED DESCRIPTION OF ILLUSTRATED EMBODIMENTS

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without creative efforts are within the scope of the present disclosure.

Referring to FIGS. 2-5, a gear shift linkage mechanism according to the present disclosure includes a gear shift linkage assembly and a spherical bowl 3 for connecting with a gear shift rocker arm (not shown). The gear shift linkage mechanism includes a connecting member 1, a gear shift linkage 2, a first elastic element 4 and a second elastic element 5, one end of the connecting member 1 is connected with the spherical bowl 3, the other end of the connecting member 1 is provided with a first through hole 121. A cavity is defined in the connecting member 1, one end of the gear shift linkage 2 is movably configured in the cavity, and the other end of the gear shift linkage 2 runs through and protrudes from the first through hole 121.

As illustrated, a limiting portion 21 is formed on the gear shift linkage 1, a first elastic element 4 is sleeved on one end of the gear shift linkage 2, one end of the first elastic element 4 abuts against one end of the limiting portion 21, and the other end of the first elastic element 4 supported on one end, which is distal from the first through hole 121, of the cavity. The second elastic element 5 is sleeved on the other end of the gear shift linkage 2, one end of the second elastic element 5 abuts against the other end of the limiting portion 21, and the other end of the second elastic element 5 is supported on the first through hole 121.

In the embodiments of the present disclosure, the first elastic element 4 and the second elastic element 5 are configured on the gear shift linkage 2. When the shock load generated during the gear shifting is transmitted to the gear shift linkage 2, the vibration of the gear shift linkage 2 can be reduced and damped due to the elastic action and the balance of the first and the second elastic elements 4 and 5 located at two ends of the limiting portion 21, thus vibration reduction and damping effect of the gear shift linkage 2 in the connecting member 1 can be achieved without using a damping rubber.

Meanwhile, since the first elastic element 4 and the second elastic element 5 are located at the two ends of the limiting portion 21, thus the gear shift linkage 2 can be balanced and do to-and-fro movement in the cavity. By comparison with the damping rubber, the buffer stoke of the first and the second elements 4 and 5 is larger, thereby sufficient buffering and damping function is acted to the gear shift rocker arm, and improving buffering and damping efficiency of the gear shift linkage mechanism.

In addition, both the first elastic element 4 and the second element 5 have spring characteristics and locate at two end of the limiting portion 21, so as to balance the gear shift linkage 2. By comparison with the condition that the gear shift linkage 2 is fixedly connected in the connecting member 1 in the prior art, the present disclosure can release axial freedom of the gear shift linkage 2 in the connecting member 1, thereby achieving the movement of the gear shift linkage 2 in the cavity, eliminating internal stress and achieving buffering and damping efficiency during the gear shifting operation.

Finally, since the gear shift linkage 2 can be moved in the cavity, thus the length of the gear shift linkage 2 is adjustable, which is beneficial to easily install the gear shift linkage 2 between different transmissions and the actuator 7. Further, during the gear shifting operation, the gear shift linkage mechanism can reduce the vibration, coming from the actuator 7, of the transmission to the minimum, and obtain the maximum vibration transfer pad value, thereby efficiently improving the buffering and damping efficiency of the gear shift linkage mechanism, so as to protect the transmission.

Figure 3:
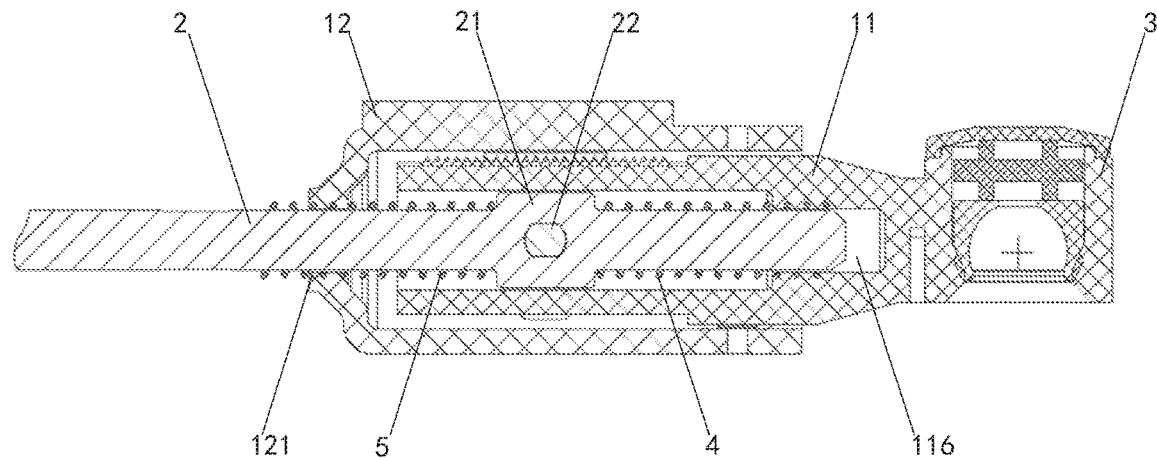
FIG. 3 is a cross sectional view of a gear shift linkage mechanism according to an embodiment of the present disclosure.
Figure 4:
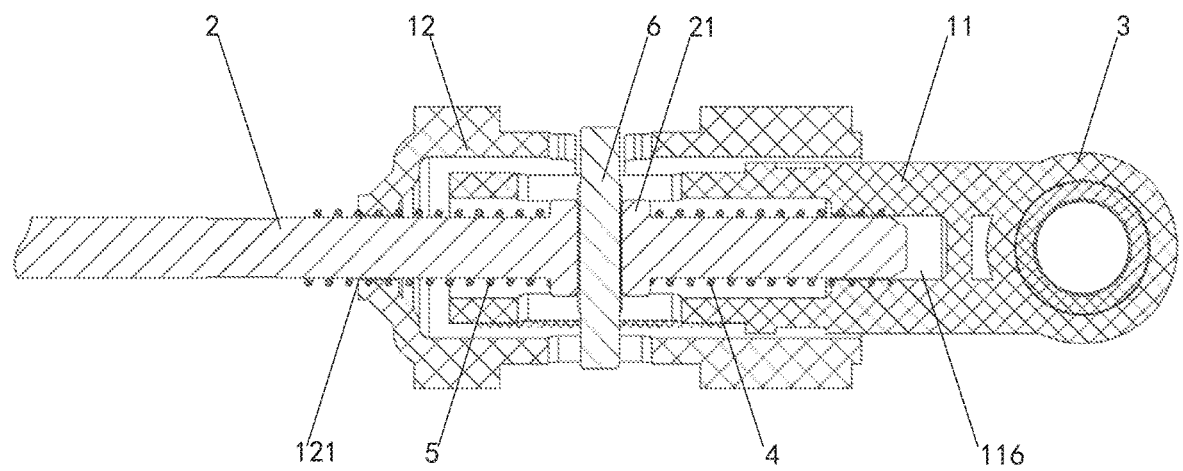
FIG. 4 is another cross sectional view of a gear shift linkage mechanism according to an embodiment of the present disclosure.

Referring to FIGS. 3 and 4, in a preferable embodiment, the other end of the second elastic element 5 is supported on the first through hole 121 and slightly protruded from the first through hole 121. Specifically, the second elastic element 5 is in immovable fitting with the wall of the first through hole 121, that is, the second elastic element 5 is retained by the first through hole 121. In such a way, the second elastic element 5 can be retained by turning, furthermore, the other end of the second elastic element is still firmly connected even if the gear shift linkage 2 is moved in the cavity, therefore the elastic parameters of the first and the second elastic elements 4 and 5 will not change, so that the reliability and the stability of the gear shift linage mechanism are improved.

Referring to FIGS. 2-5 again, in the preferable embodiments of the present disclosure, for the structure rationalization, both the first elastic element 4 and the second elastic element 5 are compression springs and are in cylindrical spiral structures. In actual demands, the first and the second elastic elements 4, 5 have the same parameter characteristics, of course can have different parameter characteristics which is dependent on external loading and omitted here.

Figure 5:
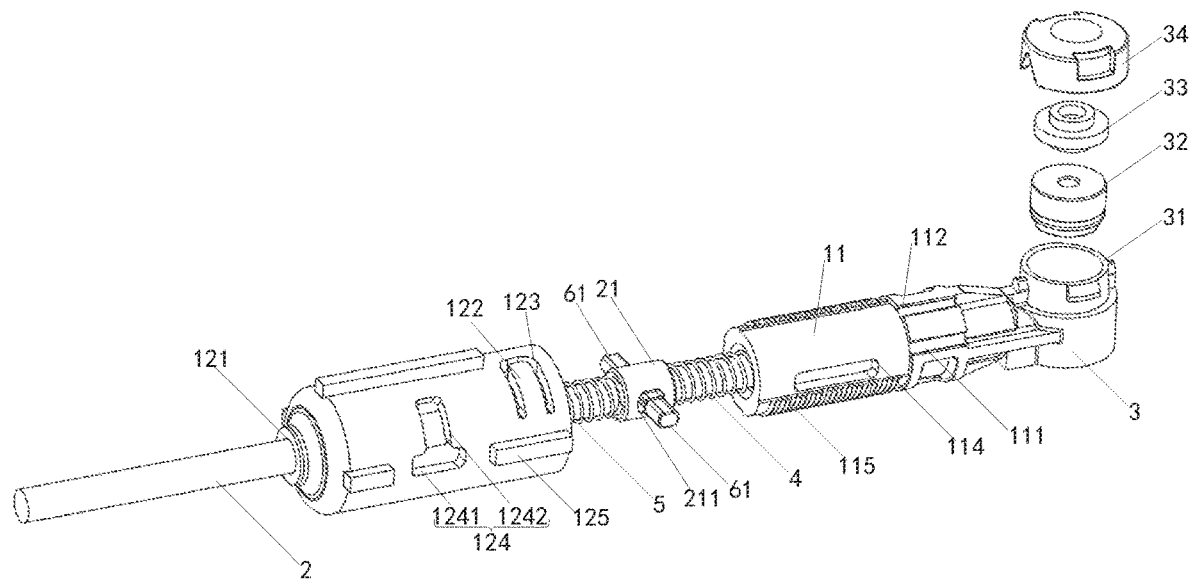
FIG. 5 is an exploded view of a gear shift linkage mechanism according to an embodiment of the present disclosure.
Figure 6:
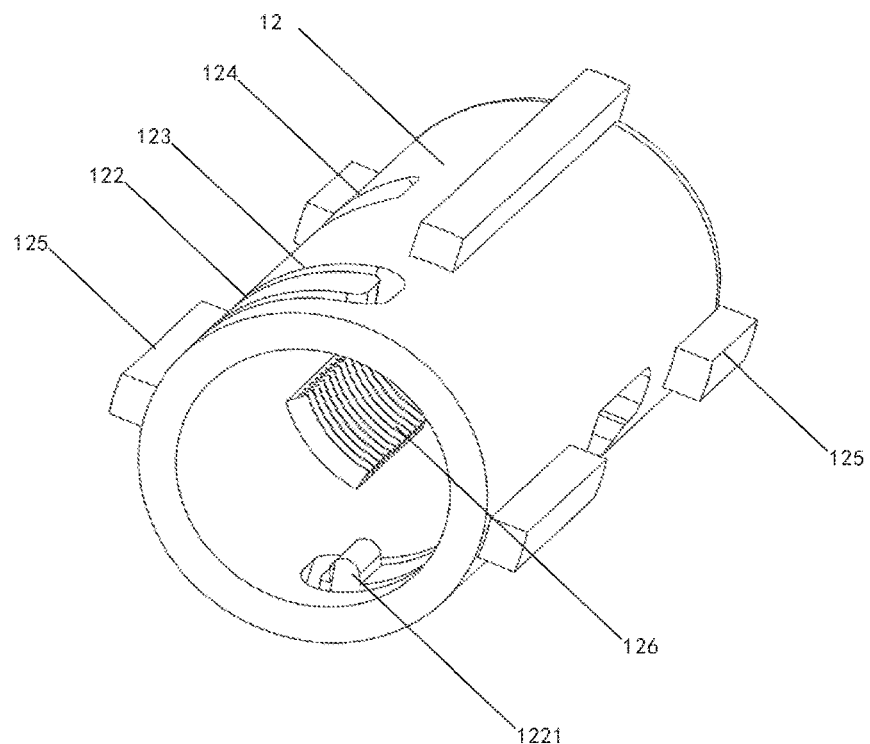
FIG. 6 is a structural diagram of an outer locking sleeve of a gear shift linkage mechanism according to an embodiment of the present disclosure.
Figure 7:
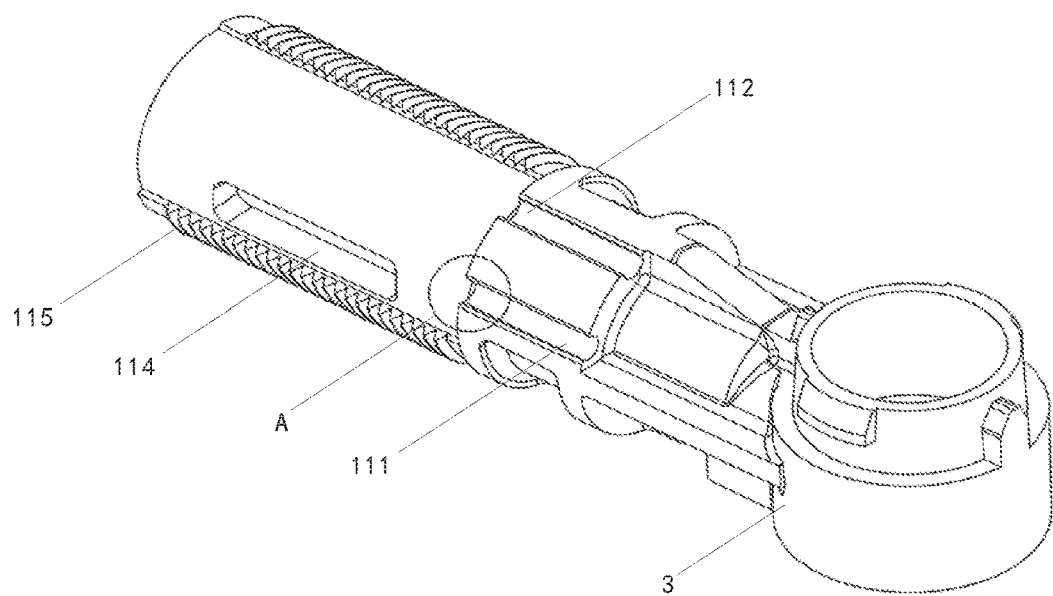
FIG. 7 is a structural diagram of an inner locking sleeve of a gear shift linkage mechanism according to an embodiment of the present disclosure.

Referring to FIGS. 5-7, in this embodiment, for the structure rationalization, the connecting member 1 includes an inner locking sleeve 11 and an outer locking sleeve 12 sleeved on the inner locking sleeve 11, and said cavity is defined between the inner locking sleeve 11 and the outer locking sleeve 12. The first through hole 121 is formed at one end of the outer locking sleeve 12, and one end, which is distal from the first through hole 121, of the inner locking sleeve 11 is connected to the spherical bowl 3. One end of the gear shift linkage is movably configured in the inner chamber of the inner locking sleeve 11, and the other end of the first elastic element 4 is supported on the inner side wall of the inner locking sleeve 11.

Specifically, the cavity is defined between the inner chamber of the inner locking sleeve 11 and the inner chamber of the outer locking sleeve 12, thereby providing movement space for the gear shift linkage 2 in the connecting member 1, and releasing the axial freedom of the gear shift linkage 2 in the connecting member 1. Further, the gear shift linkage 2 is balanced due to the cooperation of the first elastic element 4, the second elastic element 5 and the limiting portion 21, so that the gear shift linkage 2 can move backwards and forwards under an external force, thereby the internal stress generated during the gear shifting operation can be eliminated to finally achieve buffering and damping efficiency.

It should be understood, since the connecting member 1 is formed by the inner locking sleeve 11 and the outer locking sleeve 12, thus the assembly of the gear shift linkage 2 is convenient, furthermore the assembly of the inner locking sleeve 11 and the outer locking sleeve 12 is simple, thereby simplifying the structure of the connecting member 1, reducing the assembly difficulty of the gear shift linkage mechanism, and benefiting to repair, disassemble and adjust.

In the preferable embodiments, the materials of the inner locking sleeve 11 and the outer locking sleeve 12 are made of engineering plastics which have good durability, corrosion resistance, heat resistance, mechanical properties, and good impact resistance. Therefore, the energy absorption buffering effect of the gear shift linkage mechanism can be greatly enhanced.

FIG. 7 shows the inner locking sleeve according to one embodiment of the present disclosure. In this embodiment, in order to improve the compactness of the whole structure, the inner locking sleeve 11 in a cylindrical structure and has a hollow structure on one side; the inner chamber of the outer locking sleeve 12 has a cylindrical structure, and outer wall of the inner locking sleeve 11 is engaged with the inner wall of the outer locking sleeve 12.

The radius of the inner chamber of the outer locking sleeve 12 is larger than that of the inner locking sleeve 11, while the radius of the inner locking 11 is larger than that of the limiting portion 21, so as to meet the assembly demands of the inner locking sleeve 11 and the outer locking sleeve 12 and the assembly demands of the connecting member 1 and the gear shift linkage 2. Preferably, the inner chamber of the inner locking sleeve 11, the chamber of the outer locking sleeve 12, the first through hole 121 and the gear shift linkage 2 are coaxial, which simplifies the structure and improves the compactness of the connecting member 1, further improves the compactness of the gear shift linkage mechanism. Meanwhile, the gear shift linkage 2, the first through hole 121 and the inner chamber of the inner locking sleeve 11 are concentric, which benefits to reduce friction of the gear shift linkage 2 in the cavity, and therefore improves performance of the gear shift linkage mechanism.

Referring to FIGS. 5-7, it should be noted that, the material of the gear shift linkage 2 is metal, the gear shift linkage 2 has a round rod-shaped stepped shaft structure, and the radius of the limiting portion 21 is larger than that of the gear shift linkage 2, so as to limit the first and the second elastic elements 4 and 5. Preferably, the limiting portion 21 and the inner chamber of the inner locking sleeve 11 are concentric, thereby reducing the friction between the limiting portion 21 and the inner wall of the inner locking sleeve 11. Additionally, compression springs are used as the first and the second elastic elements 4 and 5, with a circular cross section, and the radius of the limiting portion 21 is larger than that of the first and the second elastic elements 4 and 5, thereby prevents offset of the first and the second elastic elements 4 and 5, and therefore ensuring normal operation of the gear shift linkage mechanism.

In this embodiment, as shown in FIGS. 3 and 4, for the structure rationalization, a stepped bore 116 is configured in the inner chamber of the inner locking sleeve 11, the stepped bore 116 and one end of the gear shift linkage 2 form a plunger pair, and the gear shift linkage 2 makes plunger motion in the stepped bore 116.

In this embodiment, the other end of the first elastic element 4 is supported on the end of the cavity which is distal from the first through hole 121, and the other end of the first elastic element 4 and the hole wall of the stepped bore 116 are in tight fit, thereby ensuring a stable elastic parameter for the first elastic element 4 and the second elastic element, and finally improving the reliability and the stability of the gear shift linkage mechanism.

Referring to FIGS. 6 and 7, an elastic lock 122 is provided on the outer locking sleeve 12 and extended along a circumferential direction of the outer locking sleeve 12, a first limiting groove 111 and a second limiting groove 112 are provided on an outer wall of the inner locking sleeve 11 and extended along an axial direction of the inner locking sleeve 11, and the first limiting groove 111 and the second limiting groove 111 are spaced apart along a circumferential direction of the inner locking sleeve 11. The elastic lock 122 is engaged with the first limiting groove 111 once the inner locking sleeve 11 is inserted into the outer locking sleeve 12, and the elastic lock 122 is disengaged from the first limiting groove 111 and finally engaged with the second limiting groove 112, once the outer locking sleeve 12 is rotated relative to the inner locking sleeve into the locking position.

The elastic lock 122 can flexibly cooperate with the first limiting groove 111 and the second limiting groove 112, since it is elastic. Specifically, the process of assembling the inner locking sleeve 11 and the outer locking sleeve 12 is as follows:

First, the inner locking sleeve 11 is inserted into the inner chamber of the outer locking sleeve 12, with the first limiting groove 111 aligning with the elastic lock 122, therefore the elastic lock 122 can be engaged with the first limiting groove 111, thereby achieving a pre-locking and limiting a rotation of the inner locking sleeve 11.

Then, the outer locking sleeve 12 is rotated relative to the inner locking sleeve 11 with a certain angle to the locking position, causing the elastic lock 122 disengage from the first limiting groove 111 due to the extruding action and finally engage with the second limiting groove 112, thereby finally achieving locking and finishing assembling.

Similarly, when there is a need to disassemble and repair, the outer locking sleeve 12 is reversely rotated relative to the inner locking sleeve 11 with a certain angle, so that the elastic lock 122 is engaged with the first limiting groove again, at this time, the inner locking sleeve 11 is pulled out from the outer locking sleeve 12, thereby finishing the disassembly.

Specifically, the elastic lock 122, the first limiting groove 111 and the second limiting groove 112 cooperate with the rotation of the outer locking sleeve 12 relative to the inter locking sleeve 11, and the rotation motion and the rotation range of the inner locking sleeve 11 are limited accordingly, thereby solving the displacement and movement problem between the outer locking sleeve 12 and the inner locking sleeve 11 before or after they are assembled together, and thereby facilitating the assembly and disassembly of the connecting member 1, and the structure is simple.

Figure 8:
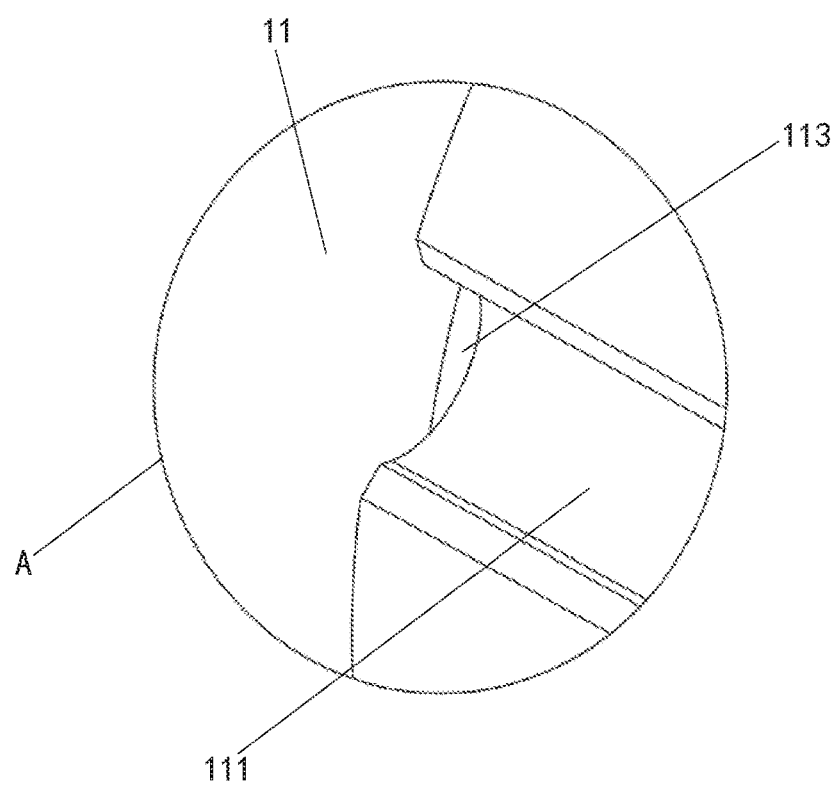
FIG. 8 is a partial enlarged view of portion A shown in FIG. 7.

Referring to FIGS. 7 and 8, for the structure rationalization, an axial limiting portion 113 is formed at one end of the first limiting groove 111 which is distal from the spherical bowl 3. Before the inner locking sleeve 11 and the outer locking sleeve 12 are assembled together, it's necessary to place the first and the second elastic elements 4 and 5 into the cavity, thus a pair of acting forces along the axial direction is generated between the inner locking sleeve 11 and the outer locking sleeve 12 when they are assembling, due to the spring forces of the first and the second elastic elements 4 and 5. Based on such a pair of acting forces, the inner locking sleeve 11 and the outer locking sleeve 12 are always kept in a separate tendency, therefore an axial movement of the elastic lock 122 in the first limiting groove 111 is limited by the axial limiting portion 113, which facilitates the assembly efficiency.

Referring to FIG. 6 again, preferably, a third through hole 123 is provided on the outer locking sleeve 12 and extended along the circumferential direction of the outer locking sleeve 12, one end of the elastic lock 122 is connected to an wall of the third through hole 123, and another end of the elastic lock 122 is provided with a bulge portion 1221 which is configured towards the inner chamber of the inner locking sleeve 11. Specifically, the bulge portion 1221 is engaged with the first limiting groove 111 once the inner locking sleeve 11 is inserted into the outer locking sleeve 12, and the bulge portion 1221 is disengaged from the first limiting groove 111 and finally engaged with the second limiting groove 112, once the outer locking sleeve 12 is rotated relative to the inner locking sleeve to the locking position.

In this embodiment, the third through hole 123 and the elastic lock 122 have a hollow structure, and the inner locking sleeve 11 is connected to the outer locking sleeve 12 by tight fit. When the elastic lock 122 is applied with extruding force, the third through hole 123 supplies a space to allow the elastic lock 122 to move, so that the axial positioning and rotation direction positioning between the inner locking sleeve 11 and the outer locking sleeve 12 can be achieved.

Additionally, it should be noted that, during the assembly process of the inner locking sleeve 11 and the outer locking sleeve 12, a pair of acting forces along the axial direction is generated between the inner locking sleeve 11 and the outer locking sleeve 12, due to the spring forces of the first and the second elastic elements 4 and 5. Based on such a pair of acting forces, the inner locking sleeve 11 and the outer locking sleeve 12 are always kept in a separate tendency, and the bulge portion 1221 is pressed against the axial limiting portion 113 to limit the axial motion of the elastic lock 122 in the first limiting groove 11, thus the outer locking sleeve 12 and the inner locking sleeve 11 are not separated, which facilitates the assembly efficiency, reduces assembly difficulty and save working time.

To be understood, when the materials of the inner locking sleeve 11 and the outer locking sleeve 12 are made of engineering plastics, so the sleeves can be molded by plastic moulds; meanwhile, the elastic lock is made of engineering plastics to improve the elasticity and reduce the manufacturing cost, thereby ensuring the reliability of the elastic lock 122 and improving the reliability and the stability of the gear shift linkage 2.

Referring to FIGS. 6 and 7, in the present embodiment, internal threads 126 are provided at the outer side wall of the outer locking sleeve 12 and extended along an axial direction of the outer locking sleeve 12, and external threads 115 are provided at the outer side wall of the inner locking sleeve 11, so as to match with the internal threads 126. When the outer locking sleeve 12 is rotated to the locking position, relative to the inner locking sleeve 11, the external threads 115 engage with the internal threads 126, thereby restricting the axial movement of the inner locking sleeve 11 and the outer locking sleeve 12.

It should be noted that, the external threads 115 and the internal threads 126 cooperate with the relative rotation motions of the outer locking sleeve 12 and the inner locking sleeve 11. During assembling, the inner locking sleeve 11 is inserted into the inner chamber of the outer locking sleeve 12 along the axis direction, they will not engage with each other unless the outer locking sleeve 12 is rotated to the locking position. Therefore the assembly process is simplified and convenient.

In this embodiment, further, by combination with the inner threads 126, the outer threads 115, the elastic lock 122, the first limiting groove 111 and the second limiting groove 112, the assembly process of the connecting member 1 is as follows.

First, the inner locking sleeve 11 is inserted into the inner chamber of the outer locking sleeve 12, with the first limiting groove 111 aligning with the elastic lock 122, therefore the elastic lock 122 engages with the first limiting groove 111. Meanwhile, the outer threads 115 and the inner threads 126 are staggered, and the outer locking sleeve 12 does not engage with the inner locking sleeve 11, thereby achieving a pre-locking of the inner locking sleeve 11 and the outer locking sleeve 12.

Then, the outer locking sleeve 12 is rotated relative to the inner locking sleeve 11 with a certain angle to the locking position, causing the elastic lock 122 disengage from the first limiting groove 111 due to the extruding action and finally engage with the second limiting groove 112, meanwhile, the external threads 115 engage with the internal treads 126, thereby achieving the locking and the limitation of the inner locking sleeve 11 and the outer locking sleeve 12, and finishing the assembly. In such a way, not only the axial motion of the inner locking sleeve 11 in the outer locking sleeve 12 is restricted, but also the rotation motion of the inner locking sleeve 11 in the outer locking sleeve 12 is restricted.

In this embodiment, it should be noted that, the number of both the internal treads 126 and the external treads 115 is two; as well, the number of the elastic lock 122, the third through hole 123, the first limiting groove 111, the second limiting groove 112, and the axial limiting portion 113 is two. Preferably, the two internal treads 126 are symmetrically configured in the outer locking sleeve 12, the two external treads 115 are symmetrically configured in the inner locking sleeve 11, the two elastic locks, the two third through holes 123 are symmetrically configured on the outer locking sleeve 12, the two first limiting groove 111, the two second limiting grooves 112, and the two axial limiting portions 113 are symmetrically on the inner locking sleeve 11.

Referring to FIGS. 5 and 6, in the present embodiment, for rationalizing the structure, multiple antiskid reinforcements 125 are formed on the outer wall of the outer locking sleeve 12 and extended along the axial direction of the outer locking sleeve 12. In this arrangement, the antiskid reinforcements 125 are beneficial to the rotation motion of the inner locking sleeve 11 and the outer locking sleeve 12. Under a condition of without the antiskid reinforcements 125, further the outer locking sleeve 12 is a smooth cylindrical structure, the assembly and disassembly processes will become difficult.

Referring to FIGS. 2-5, in this embodiment, the gear shift linkage assembly further includes a locking pin 6 having a locking pin body connected on the limiting portion 21 and a locking portion 61 connected on the locking pin body.

A first adjusting slot 114 is formed on and runs through the inner locking sleeve 11, and a second adjusting slot 124 is formed on and runs through the outer locking sleeve 11, and the free end of the locking portion 61 runs through the first adjusting slot 114 and the second adjusting slot 124.

Specifically, the locking pin 6 has a stripe structure. When the gear shift linkage 2 makes to-and-fro movements in the cavity, the locking pin 6 is actuated to do axial motions. Due to the free end of the locking portion 61 runs through the first adjusting slot 114 and the second adjusting slot 124, the range of the axial motion of the locking pin 6 is limited by the slots 114 and 124, thereby limiting the range of the motion of the shift linkage 2 in the cavity.

Referring to FIG. 5 again, preferably, the limiting portion 21 is provided with a first mounting hole 211 which is connected to the locking pin 6 by interference fit. The locking pin body is matched with the first mounting hole 211, illustratively, knurled patterns are configured on the middle position of the lock retaining body, so as to increase friction between the lock retaining body and the first mounting hole 211, and improve the tight fit therebetween, so that the stability and the reliability of the gear shift linkage mechanism is ensured.

Illustratively, the locking pin 6 made of metals has two narrow ends and a wider middle, and knurled patterns are formed on the outer surface of the locking pin 6, so as to ensure the tight fit between the gear shift linkage 2 and the locking pin 6.

Referring to FIG. 5, in the embodiment of the present disclosure, preferably, the first adjusting slot 144 is configured along the axial direction of the inner locking sleeve 11. The second adjusting slot 124 includes a first adjusting slot section 1241 and a second slot section 1242 which are interconnected with one another, the first adjusting slot section 1241 is configured along the axial direction of the outer locking sleeve 12, the second slot section 1242 is configured along the circumferential direction of the outer locking sleeve 12, and the free end of the locking pin 61 moves from the second slot section 1242 to the first adjusting slot section 1241.

Referring to FIG. 5, the second adjusting slot 124 is T-shaped, and the assemble process is as follows.

Firstly, one end of the gear shift linkage 2 is inserted into the inner chamber of the inner locking sleeve 11, and the other end of the gear shift linkage 2 passes through and protrudes from the first through hole 121.

Secondly, the inner locking sleeve 11 is inserted into the inner chamber of the outer locking sleeve 12 along the axial direction, and the first limiting groove 111 is aligned with the elastic lock 122. Meanwhile, the outer threads 115 and the inner thread 126 are staggered, and the outer locking sleeve 12 does not engage with the inner locking sleeve 11, thereby achieving a pre-locking of the inner locking sleeve 11 and the outer locking sleeve 12.

Thirdly, after determining the relative position of the inner locking sleeve 11 in the outer locking sleeve 12, the locking pin 6 runs through the second slot section 1242 of the second adjusting slot 124, and the first adjusting slot 114 and is inserted into the first mounting hole 211.

Fourthly, the outer locking sleeve 12 is rotated relative to the inner locking sleeve 11 with a certain angle to the locking position, causing the elastic lock 122 disengage from the first limiting groove 111 due to the extruding action and finally engage with the second limiting groove 112, thereby achieving rotation limitation of the inner locking sleeve 11.

Meanwhile, the external threads 115 are engaged with the internal threads 126, so as to achieve the axis fixing of the inner locking sleeve 11. During the turning process, the free end of the locking pin 61 moves from the second slot section 1242 to the first slot section 1241, which makes the free end of the locking pin 61 can move in the first slot section 1241 and the first adjusting slot 114, as the gear shift linkage 2 moves. So far, the assembly process is finished.

In this embodiment, the number of the first adjusting slot 114 and the second adjusting slot 124 is two, and the two first adjusting slots 114 and the two second adjusting slots 124 are configured symmetrically. In addition, preferably, the locking pin 6 is assembled in the connecting member 1, and the length of the locking pin 6 is larger than the sum of the inner diameter of the second adjusting slot 124 and the thickness of the wall of the second adjusting slot 124, for ensuring the movement of the locking pin 6 in the first adjusting slots 114 and the second adjusting slots 124; and the length of the locking pin 61 is smaller than the outer diameter of the antiskid reinforcements 125.

Referring to FIG. 5 again, in this embodiment, the spherical bowl 3 includes a spherical bowl recess 31, a rocker arm spherical bowl 32, a cushion pad 33, and a spherical bowl cover 34. The spherical bowl recess 31 is connected to the inner locking sleeve 11, the spherical bowl 3 is received in the spherical bowl recess 31, the spherical bowl cover 34 is disposed in the spherical bowl recess 31, and the cushion pad 33 is disposed between the spherical bowl 32 and the spherical bowl cover 34. The spherical bowl 3 is used for hinging with the gear shift rocker arm of the transmission 8, which is one of the implementation types, and details are not described herein.

Figure 10:
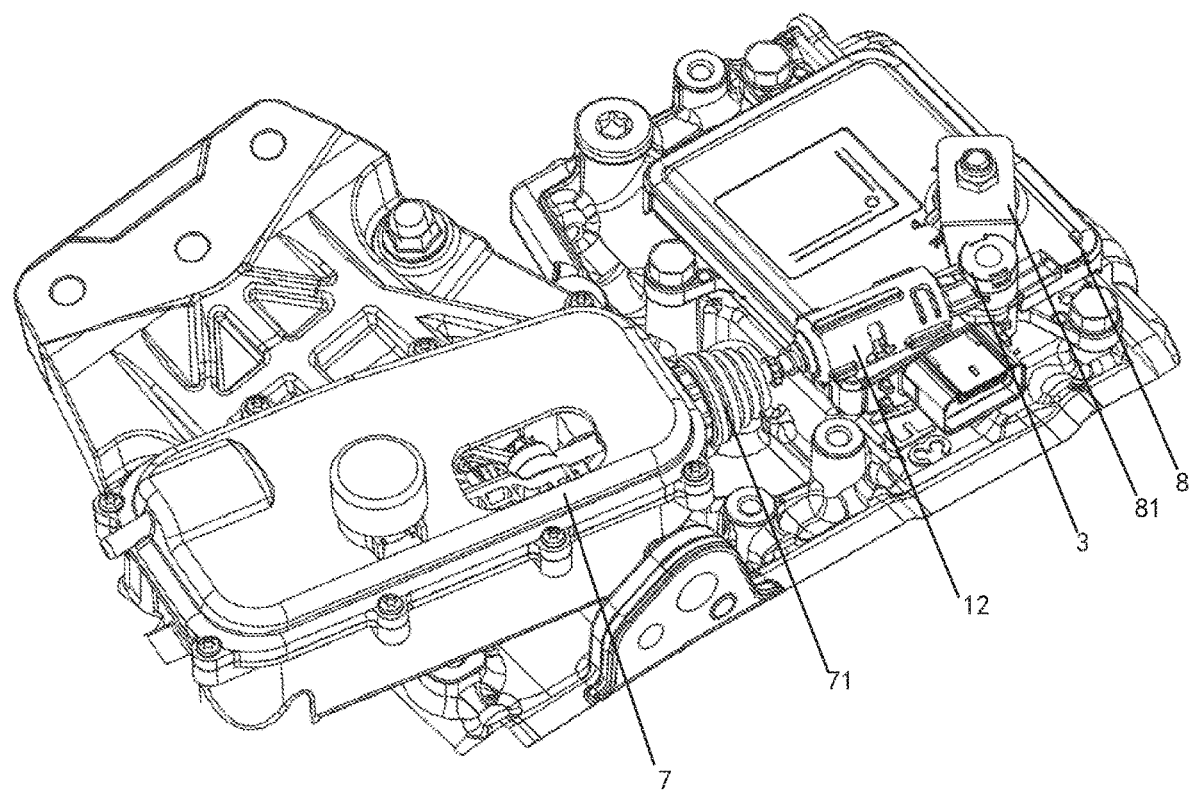
FIG. 10 is a structural diagram of a gear shift apparatus according to an embodiment of the present disclosure.

Referring to FIG. 10, in order to solve the same technical problem, the present disclosure further provides a gear shifting device including an actuator 7, a gear shift rocker arm 81 and the above-mentioned shifting linkage mechanism. The driving end of the actuator 7 is connected with the gear shift linkage 2 and protruded from the first through hole 121. The gear shift rocker arm 81 is rotatably coupled to the spherical bowl 3. Further, a dust cover 71 is provided at the driving end of the actuator 7, which functions as a dustproof cover and seals the lubricating grease to protect the bearing.

Figure 9:
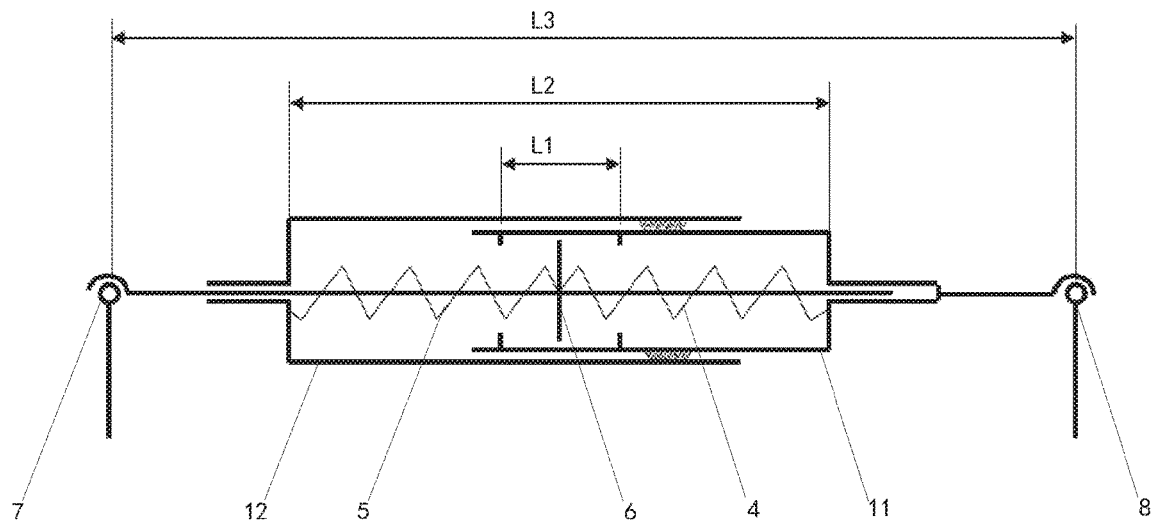
FIG. 9 is a schematic diagram of a gear shift apparatus according to an embodiment of the present disclosure.
Figure 11:
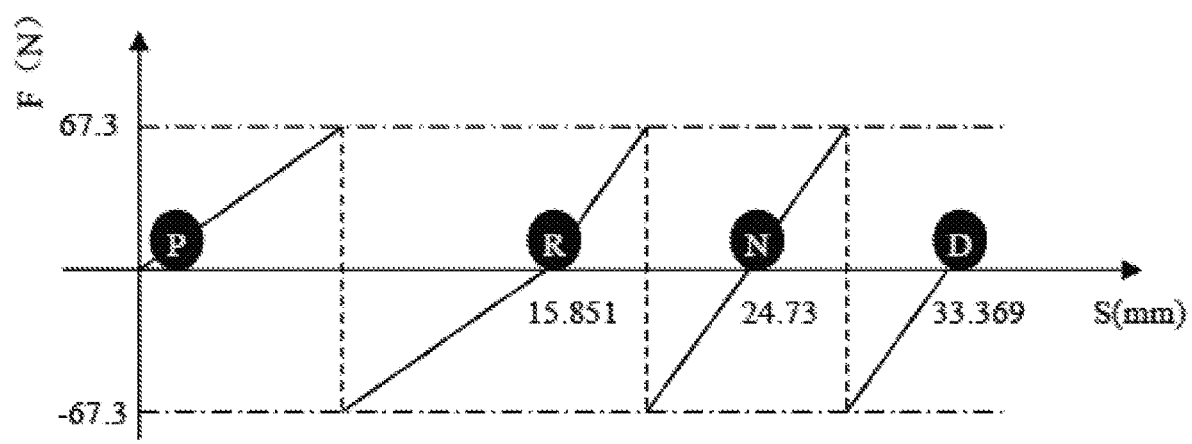
FIG. 11 is a diagram showing the relationship between the loads and the displacement of the rocker arm of the transmission.

Referring to FIGS. 9-11, FIG. 9 is a schematic diagram of a gear shifting device according to an embodiment of the present disclosure, FIG. 10 is a schematic structural view of a gear shift apparatus according to an embodiment of the present disclosure, and FIG. 11 is a diagram showing the relationship between the loads and the displacement of the rocker arm of the transmission. The manner and principle of applying the gear shift linkage mechanism of the present disclosure to the gear shift device will be described in detail below with reference to FIGS. 9-11.

Before applying the gear shift linkage mechanism to the gear shifting device, there is a need to pre-assemble the gear shifting device, as follows: first, one end of the gear shift linkage 2 is inserted into inner chamber of the inner locking sleeve 11, the other end of the gear shift linkage 2 runs through and protrudes from the first through hole 121. And then, the inner locking sleeve 11 is inserted into the inner chamber of the outer locking sleeve 12, with the first limiting groove 111 aligning with the elastic lock 122, therefore the elastic lock 122 engages with the first limiting groove 111. Meanwhile, the outer threads 115 and the inner thread 126 are staggered, and the outer locking sleeve 12 does not engage with the inner locking sleeve 11, thereby achieving a pre-locking of the inner locking sleeve 11 and the outer locking sleeve 12. Finally, after determining the relative position of the inner locking sleeve 11 in the outer locking sleeve, the locking pin 6 runs through the second slot section 1242 of the second adjusting slot 124 and the first adjusting slot 114 and is inserted into the first mounting hole 211, thereby finishing the pre-assembly of the gear shift linkage mechanism.

After that, the assembling process of assembling the gear shift linkage mechanism to the gear shift apparatus follows:

Because the gear shift linkage is assembled between the actuator 7 and the transmission 8, the relative position of the actuator 7 and the transmission 8 has manufacturing accumulated tolerance, and the distance between two spherical hinge s needs to cover at a certain range, thus the length L3 between the outer locking sleeve 12 and the inner locking sleeve is the maximum adjustable range of the gear shift linkage mechanism.

After the actuator 7 and the transmission 8 are assembled, the relative position of the two spherical hinge s becomes unique, at this time, the outer locking sleeve 12 can be rotated relative to the inner locking sleeve 11 to the locking position, causing the elastic lock 122 disengage from the first limiting groove 111 due to the extruding action and finally engage with the second limiting groove 112, thereby finally achieving the rotation limitation of the inner locking sleeve 11.

Meanwhile, the external threads 115 are engaged with the internal threads 126, so as to achieve the axis fixing of the inner locking sleeve 11. During the turning process, the free end of the locking pin 61 moves from the second slot section 1242 to the first slot section 1241, which makes the free end of the locking pin 61 can move in the first slot section 1241 and the first adjusting slot 114, as the gear shift linkage 2 moves in the cavity.

In the process, as shown in FIG. 9, when the distance L2 between the outer locking sleeve 12 and the inner locking sleeve 11 changes, the space angle between the two spherical hinge (the joint position labeled as 7 and 8) is free since the relative position between the gear shift linkage 2 and the sleeves 12 and 11 is can be moved or rotated, furthermore, due to the elastic actions of the first and the second elastic elements 4 and 5, the locking pin 6 is always kept in a balance position of the two elastic elements 4 and 5. If the rigidity of the elastic elements 4 and 5 is the same, the locking pin 6 will be located at a position where a half of the displacement of the length L2 is.

Exemplarily, referring to FIG. 9, the first elastic element 4 and the second elastic element 5 are compression springs, assuming that the right ball hinge is fixed, and the left spherical hinge is applied with an external load F along the axis to the right direction. After the load F can overcome the combined force of the two springs, the gear shift linkage 2 starts to move to the right direction, and the combined stiffness K of the two springs driven by the load F is proportional to the displacement s of the gear shift linkage 2.

When the right spherical hinge is not fixed, after the left spherical hinge is driven by the load F, the right spherical hinge point moves with the left side movement. As shown in FIG. 10, since the gear shift rocker arm 81 where the spherical hinge at the side of the transmission 8 is located is rotatable, five gears of P, R, N, D, and S are configured, and the spherical hinge at the side of the actuator 7 is driven by a motor; during the operation, the motor drives the left spherical hinge, then the left spherical hinge pushes the right spherical hinge via the gear shift linkage, so that the gear shift rocker arm 81 can be shifted among the five gears of P, R, N, D, and S. The relationship between the driving load and the displacement of the gear shift rocker arm 81 at the side of the transmission 8 is as shown in FIG. 11. There is a limit force generated on the gear shift rocker arm 81 when it is located at each gear, that is, as long as the gear shift rocker arm 81 approaches or leaves the gear, there is a pulling force or resistance to cause the gear shift rocker arm 81 move to the nearest gear.

It should be noted that, due to manufacturing and control errors, there is a certain deviation between the stroke outputted by the actuator 7 and the stroke required for the gear shift rocker arm 81 for shifting gear. At this time, if the gear shift link mechanism is rigidly connected according to the prior art as shown in FIG. 1, such a deviation will cause internal stress in one end of the two elements rigidly connected, during the gear shifting process, and even such an internal stress always exists in the life cycle. On the contrary, the gear shift linkage mechanism of the present disclosure can eliminate the internal stress by means of the elastic characteristics of the first elastic member 4 and the second elastic member 5.

In addition, there is a working condition when the actuator 7 drives the gear shift rocker arm 81 to reach the first gear (Gear P) or the last gear (Gear S), if the actuator 7 is too speedy or always applies the load to the gear shift rocker arm 81, a load impact will be generated on the mechanism inside the transmission 8 through the gear shift rocker arm 81, which will damages the transmission 8; however, the gear shift linkage mechanism according to the present disclosure can buffer and damp the load, thereby protecting the transmission 8.

In this embodiment, it can be understood that, in order to ensure that each gear shift can be in place, the limit length of the L1 can be configured, that is, the movement range of the lock pin 6 is in the first adjustment slot 114 and the first slot section 1241 can be set, thereby the desired gear can be shifted smoothly as shown in FIG. 11.

In conclusion, the gear shift linkage mechanism according to the present disclosure includes the gear shift linkage assembly and the spherical bowl 3 for connecting to the gear shift rocker arm 81. The gear shift linkage assembly includes the connecting member 1 with the cavity defined therein, one end of the connecting member 1 being connected with the spherical bowl 3, and another end of the connecting member 1 being provided with the first through hole 121; the gear shift linkage 2 with the limiting portion 21 provided thereon, one end of the gear shift linkage 2 being movably configured in the cavity, and another end of the gear shift linkage 2 passing through the first through hole 121; the first elastic element 4 sleeved on the end of the gear shift linkage 2, one end of the first elastic element 4 abutting against one end of the limiting portion, and another end of the first elastic element 4 being supported on one end, which is distal from the first through hole 121, of the cavity; and a second elastic element 5 sleeved on another end of the gear shift linkage 2, one end of the second elastic element 5 abutting against another end of the limiting portion 21, and another end of the second elastic element 5 being supported on the first through hole 121.

The present disclosure has the following beneficial effects:

First, because the first elastic element 4 and the second elastic element 5 are sleeved on the gear shift linkage 2, thus when the shock load generated during the gear shifting is transmitted to the gear shift linkage 2, the vibration of the gear shift linkage 2 can be reduced and damped due to the elastic action and the balance of the first and the second elastic elements 4 and 5 located at two ends of the limiting portion 21, therefore vibration reduction and damping effect of the gear shift linkage 2 in the connecting member 1 can be achieved without using a damping rubber.

Second, since the first elastic element 4 and the second elastic element 5 are located at the two ends of the limiting portion 21, thus the gear shift linkage 2 can be balanced and do to-and-fro movement in the cavity. By comparison with the damping rubber, the buffer stoke of the first and the second elements 4 and 5 is larger, thereby sufficient buffering and damping function is acted to the gear shift rocker arm, and improving buffering and damping efficiency of the gear shift linkage mechanism.

Third, both the first elastic element 4 and the second element 5 have spring characteristics and locate at two end of the limiting portion 21, so as to balance the gear shift linkage 2. By comparison with the condition that the gear shift linkage 2 is fixedly connected in the connecting member 1 in the prior art, the present disclosure can release axial freedom of the gear shift linkage 2 in the connecting member 1, thereby achieving the movement of the gear shift linkage 2 in the cavity, eliminating internal stress and achieving buffering and damping efficiency during the gear shifting operation.

Fourth, since the gear shift linkage 2 can move in the cavity, thus the length of the gear shift linkage 2 is adjustable, which is beneficial to easily install the gear shift linkage 2 between different transmissions and the actuator 7. Further, during the gear shifting operation, the gear shift linkage mechanism can reduce the vibration, coming from the actuator 7, of the transmission to the minimum, and obtain the maximum vibration transfer pad value, thereby efficiently improving the buffering and damping efficiency of the gear shift linkage mechanism, so as to protect the transmission 8.

Fifth, the elastic lock 122, the first limiting groove 111 and the second limiting groove 112 cooperate with the rotation of the outer locking sleeve 12 relative to the inter locking sleeve 11, and the rotation motion and the rotation range of the inner locking sleeve 11 are limited accordingly.

Sixth, the external threads 115 and the internal threads 126 cooperate with the relative rotation motion of the outer locking sleeve 12 and the inner locking sleeve 11, thereby restricting the axial movement of the inner locking sleeve 11 and the outer locking sleeve 12. The third through hole 123 and the elastic lock 122 have a hollow structure, and the inner locking sleeve 11 is connected to the outer locking sleeve 12 by tight fit. When the elastic lock 122 is applied with extruding force, the third through hole 123 supplies a space to allow the elastic lock 122 to move, so that the axial positioning and rotation direction positioning between the inner locking sleeve 11 and the outer locking sleeve 12 can be achieved.

Seventh, the internal threads 126 and the external threads 115 cooperate with the elastic lock 122, the first limiting groove 111 and the second limiting groove 112, in such a way, the rotation motion and the rotation range of the inner locking sleeve 11 are limited accordingly, and furthermore, the axial motion of the inner locking sleeve 11 in the outer locking sleeve 12 is also limited, thereby solving the displacement and movement problem between the outer locking sleeve 12 and the inner locking sleeve 11 before or after they are assembled together, and finally facilitating the assembly and disassembly of the connecting member 1, and the structure is simple.

While the disclosure has been described in connection with what are presently considered to be the most practical and preferable embodiments, it is to be understood that the disclosure is intended to cover various modifications and equivalent arrangements made by those skilled in the art and included within the spirit and scope of the disclosure.

What is claimed is:

1. A gear shift linkage mechanism, comprising a gear shift linkage assembly and a spherical bowl for connecting to a gear shift rocker arm, and the gear shift linkage assembly comprising:
    a connecting member with a cavity defined therein, one end of the connecting member being connected with the spherical bowl, and another end of the connecting member being provided with a first through hole;
    a gear shift linkage provided with a limiting portion, one end of the gear shift linkage being movably engaged in the cavity, and another end of the gear shift linkage passing through the first through hole;
    a first elastic element sleeved on one end of the gear shift linkage, one end of the first elastic element abutting against one end of the limiting portion, and another end of the first elastic element being supported on an end, which is distal from the first through hole, of the cavity; and
    a second elastic element sleeved on another end of the gear shift linkage, one end of the second elastic element abutting against another end of the limiting portion, and another end of the second elastic element being supported on the first through hole;
    wherein the connecting member comprises an inner locking sleeve, an outer locking sleeve sleeved on the inner locking sleeve, and the cavity defined between an inner chamber of the inner locking sleeve and an inner chamber of the outer locking sleeve; the first through hole is formed on one end of the outer locking sleeve, and an end, which is distal from the first through hole, of the inner locking sleeve is connected with the spherical bowl; one end of the gear shift linkage is movably engaged in the inner chamber of the inner locking sleeve, and another end of first elastic element is supported on an inner wall of the inner locking sleeve; and,
    wherein an elastic lock is provided on the outer locking sleeve and extended along a circumferential direction of the outer locking sleeve, a first limiting groove and a second limiting groove are provided on an outer wall of the inner locking sleeve and extended along an axial direction of the inner locking sleeve, and the first limiting groove and the second limiting groove are spaced apart along a circumferential direction of the inner locking sleeve; the elastic lock is engaged in the first limiting groove when the inner locking sleeve is inserted into the outer locking sleeve; and the elastic lock is disengaged from the first limiting groove and finally engaged in the second limiting groove when the outer locking sleeve is rotated relative to the inner locking sleeve into a locking position.

2. The gear shift linkage mechanism according to claim 1, wherein one end, which is distal from the spherical bowl, of the first limiting groove is provided with an axial limiting portion.

3. The gear shift linkage mechanism according to claim 1, wherein a third through hole is provided on the outer locking sleeve and extended along the circumferential direction of the outer locking sleeve, one end of the elastic lock is connected to a wall of the third through hole, and another end of the elastic lock is provided with a bulge portion which is configured towards the inner chamber of the inner locking sleeve; the bulge portion is engaged in the first limiting groove when the inner locking sleeve is inserted into the outer locking sleeve; and the bulge portion is disengaged from the first limiting groove and finally engaged in the second limiting groove, when the outer locking sleeve is rotated relative to the inner locking sleeve into the locking position.

4. The gear shift linkage mechanism according to claim 1, wherein internal threads are provided on an outer wall of the outer locking sleeve and extended along the axial direction of the outer locking sleeve, external threads that match with the internal threads are provided on an outer wall of the inner locking sleeve, and the external threads are engaged with the internal threads when the outer locking sleeve is rotated relative to the inner locking sleeve into the locking position.

5. The gear shift linkage mechanism according to claim 1, wherein the gear shift linkage assembly further comprises a locking pin having a locking pin body connected to the limiting portion and a locking portion connected to the locking pin body; the inner locking sleeve is provided with a first adjusting slot running through the inner and outer walls of the inner locking sleeve, the outer locking sleeve is provided with a second adjusting slot running through the inner and outer walls of the outer locking sleeve, and a free end of the locking pin passes through the first adjusting slot and the second adjusting slot.

6. The gear shift linkage mechanism according to claim 5, wherein a first mounting hole is provided on the limiting portion, and the locking pin body is engaged with the first mounting hole by interference fit.

7. The gear shift linkage mechanism according to claim 5, wherein the first adjusting slot is configured along an axial direction of the inner locking sleeve, the second adjusting slot comprises a first slot section and a second slot section communicating with one another, the first slot section is configured along an axial direction of the outer locking sleeve, the second slot section is configured along a circumferential direction of the outer locking sleeve, and the free end of the locking pin moves from the second slot section to the first slot section when the outer locking sleeve is rotated relative to the inner locking sleeve into the locking position.

8. A gear shift apparatus, comprising an actuator, a gear shift rocker arm and the gear shift linkage assembly according to claim 1, the actuator having a driving end connected to an end of the gear shift linkage that passes through the first through hole, and the gear shift rocker arm being rotatably connected to the spherical bowl.

9. The gear shift linkage mechanism according to claim 2, wherein a third through hole is provided on the outer locking sleeve and extended along the circumferential direction of the outer locking sleeve, one end of the elastic lock is connected to a wall of the third through hole, and another end of the elastic lock is provided with a bulge portion which is configured towards the inner chamber of the inner locking sleeve; the bulge portion is engaged in the first limiting groove when the inner locking sleeve is inserted into the outer locking sleeve; and the bulge portion is disengaged from the first limiting groove and finally engaged in the second limiting groove, when the outer locking sleeve is rotated relative to the inner locking sleeve into the locking position.

\* \* \* \* \*